United States Patent [19]
Cattane

[11] Patent Number: 5,261,254
[45] Date of Patent: Nov. 16, 1993

[54] SELF REPLENISHING WINDSHIELD WASHER SYSTEM

[75] Inventor: Michael R. Cattane, Mt. Clemens, Mich.

[73] Assignee: Chrysler Corporation, Highland Park, Mich.

[21] Appl. No.: 884,819

[22] Filed: May 18, 1992

[51] Int. Cl.⁵ .............................................. F25D 23/00
[52] U.S. Cl. ................................... 62/271; 15/250.001; 62/94; 62/244
[58] Field of Search ............. 62/91, 93, 94, 244, 62/291, 271; 15/250.01, 250.001

[56] References Cited

U.S. PATENT DOCUMENTS

| | | | |
|---|---|---|---|
| 3,322,411 | 5/1967 | Moore | 62/94 |
| 3,355,908 | 12/1967 | Anglin | 62/244 |
| 3,498,076 | 3/1970 | Michael | 62/291 |
| 3,575,009 | 4/1971 | Kooney | 62/93 |
| 3,888,412 | 6/1975 | Lindo | 15/250.01 |
| 3,926,000 | 12/1975 | Scofield | 62/244 |
| 4,437,318 | 3/1984 | Werjefelt | 62/93 |

*Primary Examiner*—Ronald C. Capossela
*Attorney, Agent, or Firm*—Edward P. Barthel

[57] ABSTRACT

A method and apparatus are disclosed for self-replenishment of the solution contained within an automobile windshield washer system. Water is extracted from air such as through the use of a desiccant system in combination with an automobile air conditioning system. This water is combined with a stored concentrated antifreeze liquid in a preselected ratio to produce a windshield washer solution having sufficient freezing point depression for use during winter weather conditions.

19 Claims, 1 Drawing Sheet

SELF REPLENISHING WINDSHIELD WASHER SYSTEM

BACKGROUND OF THE INVENTION

1. Technical Field

The present invention relates generally to an apparatus and method for producing an anti-freeze water solution and particularly concerns an apparatus and method for replenishing fluid within an automobile windshield washer reservoir.

2. Discussion

Currently available automobile windshield washer systems employ the use of a manually replenished anti-freeze solution reservoir from which a windshield washer anti-freeze solution is drawn for delivery to a windshield surface. Commonly used washer solutions include methanol-water mixtures or ammonia-methanol-water mixtures. These solutions are mixed at preselected ratios appropriate for achieving sufficient freezing point depression to avoid freezing of the washer solution in the climate of their use.

Disadvantages associated with this type of system include the safety concern of poor driver visibility associated with depleting the washer solution supply in transit when additional fluid is required to clean the windshield surface. In addition, there is inconvenience associated with the required frequent refilling of the windshield washer reservoir, especially during winter months when the fluid is used most often. Because of the demand for large quantities of windshield washer solution during these periods, current systems must maintain a reservoir of sufficient size to prevent constant refilling of the system from becoming necessary. A large windshield washer reservoir, however, occupies a substantial amount of space within an automobile engine compartment and when filled to or near capacity, adds weight to the vehicle. Thus, the current designs for automobile windshield washer systems are detrimental toward efforts directed to achieving greater space efficiency for reducing engine compartment size and reducing vehicle weight.

Because the operation of an automobile windshield washer system during cold winter weather conditions requires a windshield washer fluid that remains in liquid form at low temperatures, the use of pure water as a washer fluid is impractical or impossible, as winter temperatures commonly fall below the freezing point of the water. It is therefore essential that a freezing point depressant additive be introduced to water used for cleaning the windshield. Available freezing point depressants include alcohols such as methyl alcohol, propylene glycol, isopropyl alcohol, ethyl alcohol, and ethylene glycol. In typical windshield washer systems, an alcohol additive such as the above is combined with water to form an anti-freeze washer solution.

Because adequate freezing point depression for many applications is obtained for methanol-water windshield washer solutions having 60% to 70% water, both the size and the required replenishment frequency of the anti-freeze washer solution reservoir could be reduced if a replenishment of the water component of the solution could take place aboard an automobile in operation and such water combined with liquid from a concentrated anti-freeze liquid reservoir to form a mixed windshield washer solution of selected concentration.

Several methods have been disclosed in the prior art for obtaining a water supply for various uses aboard an automobile. U.S. Pat. Nos. 3,199,307 to Willis; 3,210,956 to Maier et al.; 3,498,076 to Michael; and 3,882,692 to Watanabe et al. all disclose the collection of water from automobile air conditioning units. Use of these methods as a means for obtaining water to mix with a pure anti-freeze liquid would require that the automobile air conditioning unit be in operation at those times when replenishing of the windshield washer fluid reservoir becomes necessary. As a matter of common practice, however, automobile air conditioning units are not in constant use during the winter months of highest demand on a windshield washer system, as they tend to be used only for temporary initial defogging or defrosting purposes. Therefore, some alternate means must be employed for collecting water aboard an operating automobile for addition to a windshield washer system.

U.S Pat. No. 3,846,866 to Bryant discloses an apparatus for collecting road surface water by utilizing the flinging action of a rotating tire. Use of this type of system for the present application would not be practical, however, for several reasons. Such a system is dependent upon the presence of adequate amounts of water on the road surface below the automobile to be collected through the flinging action of one or more tires. Further, such road surface water is likely to include substantial amounts of dirt and particulate matter, including small stones, which must be removed by a filtering means to produce a windshield washer solution that will not clog water or washer solution supply lines, will not damage pumps used to transport water and washer solution throughout the washer system and will not scratch an automobile windshield by the action of windshield wipers.

Accordingly, the need exists for an improved method and apparatus for automatic replenishment of a windshield washer system during automobile operation. Most importantly, the need exists for an improved means for automatically replenishing the water component of an automobile windshield washer system during automobile operation.

SUMMARY OF THE INVENTION

In accordance with the present invention, a self-replenishing windshield washer system is provided. The system of the present invention utilizes a desiccant system which works in combination with an automobile air conditioning system to produce water which is combined with a concentrated anti-freeze liquid in a preselected ratio to produce a windshield washer anti-freeze solution.

Accordingly, it is an object of the present invention to overcome disadvantages associated with depletion of an automobile windshield washer solution reservoir during automobile operation.

It is another object of the present invention to overcome disadvantages associated with frequently required manual replenishment of automobile windshield washer solution systems.

A further object of the present invention is to reduce the amount of space required within an automobile engine compartment for a windshield washer system.

A further object of the present invention is to reduce the weight contribution from an automobile windshield washer system to the weight of a vehicle.

BRIEF DESCRIPTION OF THE DRAWING

The various advantages of the present invention will become apparent to one skilled in the art after reading the following specification and by reference to the drawing in which.

DETAILED DESCRIPTION OF THE PREFERRED EMBODIMENT

Figure 1:
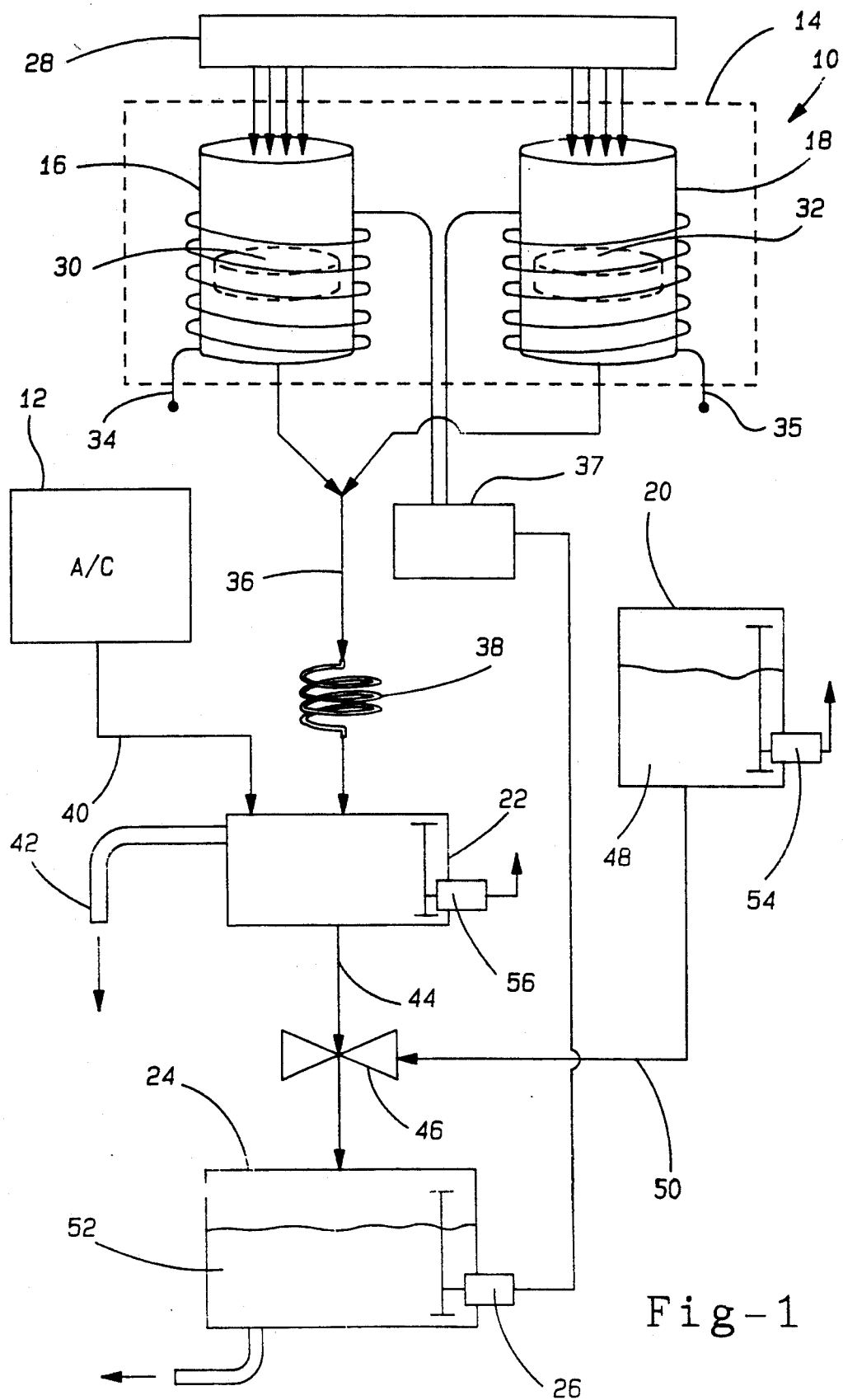
FIG. 1 is a schematic diagram illustrating the components of the self-replenishing windshield washer system in the preferred embodiment.

It should be understood at the outset that while this invention is described in connection with a particular example, the scope of the invention need not be so limited since those skilled in the art will appreciate that its teachings can be used in a much wider variety of industrial applications than the example specifically mentioned herein.

Referring now to FIG. 1, a self-replenishing windshield washer system is generally shown at 10. Self-replenishing windshield washer system 10 includes as primary components an automobile air conditioning system 12, a desiccant system 14 constructed to include a pair of desiccant units 16 and 18, an anti-freeze liquid reservoir 20, a water reservoir 22 and a windshield washer solution reservoir 24.

Desiccant system 14 is provided for removal and storage of moisture from the air; which moisture can be later released from the system and used as a water source for replenishment of the windshield washer solution. The desiccant system 14 includes a pair of desiccant units 16 and 18 which have desiccant cartridges 30 and 32 affixed therein Introduction of ambient air 28 into desiccant units 16 and 18 collects moisture in the desiccant cartridges 30 and 32. In a preferred embodiment of this invention, desiccant cartridges 30 and 32 are shaped in a flat, round pancake orientation of approximately ⅛ thickness to provide optimum efficiency in removal of moisture. While many types of desiccants could be utilized in the present invention molecular sieves are particularly preferred materials for use as the desiccant material Molecular sieve materials to be useful in the present invention generally have greater than 12% by weight water retention, typically greater than 15% by weight water retention, and preferably 17-20% by weight water retention. A particularly preferred material is a molecular sieve such as Molecular Sieve Type 4A-XH-5, a bead form of desiccant material sold by the Union Carbide Corporation of Danbury, Conn. In alternative embodiments, other desiccant materials such as silica gel, activated alumina and other types of molecular sieves can be employed which have water retention levels in the ranges set forth above. In yet other alternative embodiments, the number of desiccant units can be increased to provide greater water extraction capability.

In a preferred embodiment, a duct system (not shown) is provided for channeling ambient air 28 into the desiccant system 14 which duct system captures and directs air flowing toward and past an automobile during its forward movement. Alternatively, ambient air 28 can be captured and directed to the desiccant system 14 during stationary idling periods through the use of a fan or other blower means located within the air intake apparatus connected to the desiccant system 14. In an alternate embodiment, the exhaust system from the vehicle could be used as a source of water vapor for routing through the desiccant system 14.

After water in the form of vapor is collected by the molecular sieve material within cartridges 30 and 32, the water vapor can be extracted through heating desiccant cartridges 30 and 32 to a temperature of from about 180° F. to about 200° F., at which temperature the molecular sieve material contained within cartridges 30 and 32 desorbs the water extracted from the ambient air 28. Heating coils 34 and 35 are located about desiccant cartridges 30 and 32 for heating the desiccant material for regeneration of the molecular sieve. Once water has been desorbed from the desiccant cartridges 30 and 32, the molecular sieve material is regenerated. After cooling to an ambient temperature the molecular sieve material may be reused for further absorption of water from the air.

Water vapor extracted during regeneration of the desiccant system 14 is condensed within coil condenser 38 for providing liquid water for use in the system. In a preferred embodiment, the desiccant system 14 is positioned at the top of the windshield washer system to allow water to flow by gravity from the coil condenser 38 to be collected within water reservoir 22, which includes an overflow line 42 exiting from the top of the reservoir for allowing excess water not needed by the self-replenishing windshield washer system 10 to be deposited onto the ground beneath the automobile. In an alternative embodiment, the water reservoir 22 is eliminated, such that water extracted within desiccant system 14 is introduced into the windshield washer solution reservoir 24 without prior storage.

While desiccant units 16 and 18 may preferably be operated simultaneously, in an alternative embodiment, desiccant units 16 and 18 can be operated alternately during periods where demand for water production is not high. In this embodiment, one desiccant unit can operate while the other is returning to an absorbing condition by cooling to an ambient temperature.

During high humidity summer conditions, the operation of air conditioning system 12 can also supply water to the windshield washer solution reservoir 24. Air conditioning system 12 is of the type normally employed in automobiles, which system typically contains a compressor, evaporator and condenser (not shown). The condenser in the air conditioning system 12 can be utilized for collection of water for use in the present invention. Water collected by air conditioning system 12 drains by gravity through air conditioning condensate drain line 40 into water reservoir 22. In the alternative embodiment which eliminates the water reservoir 22, water collected by the air conditioning system 12 is introduced directly into the windshield washer solution reservoir 24 when needed. A control means (not shown) can also be employed to regulate the direction of air conditioning condensate toward the ground beneath the automobile when additional water for the windshield washer solution reservoir 24 is not needed.

A control mechanism 37 is provided for switching between air conditioning system water production and desiccant system water production for replenishing windshield washer solution reservoir 24. Control mechanism 37 is also employed for switching between alternate and parallel operation of desiccant units 16 and 18 through the operation of heating coils 34 and 35 in alternate or parallel operation.

Under any mode of operation, water traveling through desiccant system output line 36 or air conditioning condensate drain line 40 and stored within water reservoir 22 or introduced directly without prior storage drains by gravity into windshield washer solution reservoir input line 44, which contains mixing valve 46. Anti-freeze liquid such as methanol is fed to the mixing valve from reservoir 20 through supply line 50. Mixing valve 46 can be adjusted to pass a preselected ratio of water from either desiccant system output line 36 or air conditioning condensate drain line 40 and anti-freeze from anti-freeze liquid supply line 50. This mixture then passes through the remainder of the windshield washer solution reservoir input line 44 and into the windshield washer solution reservoir 24. The resulting water mixed with anti-freeze liquid constitutes the windshield washer solution 52. In an alternative embodiment, the extracted water is mixed with a methanol-ammonia solution to form an anti-freeze solution.

Alcohol additive ratios of 0.3 to 0.6 provide the best freezing point depression for automotive applications in most winter climates, as these ratios lower the freezing point of the water solution to as low as −60° F. In each instance, the freezing point depression effect of an anti-freeze additive is enhanced throughout the progression of anti-freeze additive volume ratios from 0.3 to 0.6. For automobile windshield washer applications, the anti-freeze additive exhibiting the best freezing point depression which utilizes the smallest amount of additive, is methanol. Typically, methanol in concentrations of 30% by volume, lowers the solution freezing point to −6° F. A 40% by volume methanol dilution further lowers the solution freezing point to −25° F.

The windshield washer fluid reservoir 24 is equipped with a sensor 26 which measures the level of washer solution in reservoir 24 and activates or deactivates the self-replenishing windshield washer system 10 based on this measured level. During the low humidity winter conditions when air conditioning system 12 is not in operation, sensor 26 initiates the operation of desiccant system 14.

Sensors 54 and 56 located within anti-freeze liquid reservoir 20 and water reservoir 22 are employed to advise the driver of a low anti-freeze liquid and water levels by means of warning lights or gauges located on the instrument panel of the automobile. The windshield washer solution 52 contained within windshield washer solution reservoir 24 is delivered to the automobile windshield by conventional pumping means and associated tubing (not shown).

Thus, in operation, sensor 26 measures the level of windshield washer solution 52 present within windshield washer solution reservoir 24 and initiates production of additional solution when reservoir 24 is not full. Control mechanism 37 detects whether air conditioning system 12 is in current operation, and if not in operation, initiates the operation of desiccant system 14. Ambient air 28 enters desiccant units 16 and 18 by the capturing of air passing toward and past the automobile while in forward motion by a duct system (not shown), or by the blowing of air into such duct system by fan or other blower means (not shown) when the automobile is stationary or otherwise not able to capture air through forward motion. Desiccant cartridges 30 and 32 absorb moisture from ambient air 28 passing through desiccant units 16 and 18. When water becomes absorbed by desiccant cartridges 30 and 32, control mechanism 37 initiates the operation of heating coils 34 and 35 for heating desiccant cartridges 30 and 32 in parallel or alternate mode, depending upon the amount of water needed to replenish windshield washer solution reservoir 24. When desiccant cartridges 30 and 32 reach a temperature of 180° F. to 200° F., they release water vapor into desiccant system output line 36 and into coil condenser 38, where the vapor is condensed into liquid water. The liquid water then flows by gravity into water reservoir 22, where it is stored for future introduction to reservoir 24.

When control mechanism 37 detects current operation of air conditioning system 12, water removed from the air within the passenger compartment of the automobile by air conditioning system 12 and condensed into liquid form by the condenser with air conditioning system 12 flows by gravity through air conditioning condensate drain line 40 into water reservoir 22, and control mechanism 37 does not initiate operation of desiccant system 14.

Water within water reservoir 22 flows by gravity into windshield washer solution reservoir input line 44, which contains mixing valve 46. Mixing valve 46 blends water from water reservoir 22 with concentrated methanol 48 from anti-freeze liquid reservoir 20, which flows by gravity through anti-freeze liquid supply line 50, in a preselected ratio to form windshield washer solution which flows by gravity from the mixing valve, through the remainder of windshield washer solution reservoir input line 44, and into windshield washer solution reservoir 24. windshield washer solution 52 stored within the reservoir 24 is delivered as needed to the automobile windshield surface through associated conventional pumps and tubing (not shown).

The self-replenishing windshield washer system of the present invention overcomes disadvantages associated with depletion of a windshield washer solution reservoir during automobile operation by providing an apparatus and method for automatically replenishing the solution during transit.

The self-replenishing windshield washer system of the present invention also overcomes disadvantages associated with frequently required manual replenishment of automobile windshield washer solution systems by substantially reducing the frequency of required manual maintenance to that required for replenishment of only the anti-freeze liquid component of the windshield washer solution.

The self-replenishing windshield washer system of the present invention also reduces the amount of space required within an automobile engine compartment for a windshield washer fluid system by substantially reducing the required size of the reservoir containing windshield washer solution from its current large volume commonly employed in automobiles today.

The self-replenishing windshield washer system of the present invention also reduces the weight contribution from an automobile windshield washer system to the weight of a vehicle. Because satisfactory freezing point depression of windshield washer fluid can be obtained through methanol to water ratios of 0.3 to 0.4 for most winter climate applications, the volume of concentrated methanol which need be stored within an automobile engine compartment is relatively small. In addition, because the specific gravity of methanol is less than the specific gravity of water, the storage of methanol in pure form aboard a vehicle causes less weight addition to the car than does the storage of a large reservoir of a methanol-water mixture.

While the above detailed description describes a preferred embodiment of the present invention, it will be understood that the description is exemplary in nature and is not intended to limit the scope of the invention. The present invention will therefore be understood as susceptible to modification, alteration and variation by those skilled in the art without deviating from the scope and meaning of the following claims.

What is claimed is:

1. An apparatus for producing an anti-freeze water solution in a vehicle comprising:
   extracting means including a desiccant for extracting water from an air stream,
   a first reservoir containing a concentrated anti-freeze liquid;
   a heating means for heating of said desiccant to release water from the desiccant material; and
   mixing means for mixing water extracted from the air stream with the concentrated anti-freeze liquid in a preselected ratio to yield an anti-freeze water solution.

2. The apparatus of claim 1 further comprising a second reservoir for collecting the anti-freeze water solution.

3. The apparatus of claim 1 wherein the extracting means comprises a desiccant collection system.

4. The apparatus of claim 2 further comprising a second sensor means for sensing when the anti-freeze water solution in the second reservoir is in low supply.

5. The apparatus of claim 2 further comprising a third reservoir for collecting the extracted water from the extracting means.

6. The apparatus of claim 5 further comprising a third sensor means for sensing when the water in the third reservoir is in short supply.

7. The apparatus of claim 1 wherein the extracting means further comprises an air conditioner system.

8. The apparatus of claim 1 wherein the mixing means comprises a mixing valve.

9. The apparatus of claim 1 wherein the extracting means further comprises a desiccant system operating in combination with an air conditioner system.

10. The apparatus of claim 9 further comprising a control means for controlling the relative extracting operation of the desiccant system and the air conditioner system.

11. The apparatus of claim 1 wherein the concentrated anti-freeze liquid is methyl alcohol.

12. The apparatus of claim 1 further comprising a first sensor means for sensing when the concentrated anti-freeze liquid in the first reservoir is in low supply.

13. An apparatus for producing an anti-freeze water solution comprising:
   a desiccant system for extracting water from an air stream, said desiccant system comprising a plurality of desiccant material cartridges and heating means for heating the desiccant cartridges to thereby release water from the desiccant material;
   a reservoir containing a concentrated anti-freeze liquid; and
   mixing means for mixing water extracted from the air stream with the concentrated anti-freeze liquid in a preselected ratio to yield an anti-freeze water solution.

14. The apparatus of claim 13 wherein the desiccant material is a molecular sleeve.

15. The apparatus of claim 13 wherein the heating means comprises a resistance coil located about the desiccant system.

16. An apparatus for producing an anti-freeze water solution comprising:
   a molecular sieve collection device for extracting water from an air stream;
   an air conditioning system for extracting water from air;
   a first reservoir containing concentrated methanol;
   a mixing valve for mixing water from the molecular sieve collection device with the concentrated methanol to yield an anti-freeze water solution;
   a second reservoir for collecting the anti-freeze water solution; and
   sensor means for sensing when the anti-freeze water solution is in low supply.

17. The apparatus of claim 16 further comprising a third reservoir for collecting the extracted water from the molecular sieve collection device.

18. The apparatus of claim 16 further comprising a second sensor means for sensing when the concentrated methanol is in low supply.

19. The apparatus of claim 17 further comprising a third sensor means for sensing when the water in the third reservoir is in short supply.

* * * * *